United States Patent [19]
Eckels

[11] 3,814,459
[45] June 4, 1974

[54] VEHICLE PASSENGER CRASH PROTECTOR
[76] Inventor: Robert E. Eckels, 2101 Youngfield St., Golden, Colo. 80401
[22] Filed: Mar. 27, 1972
[21] Appl. No.: 238,455

[52] U.S. Cl. ............................................ 280/150 B
[51] Int. Cl. ............................................ B60r 21/02
[58] Field of Search ............... 280/150 B; 296/84 K

[56] References Cited
UNITED STATES PATENTS
2,180,912  11/1939  Rogers .............................. 296/84 K
2,843,420  7/1958  Rich .................................. 296/84 K
2,854,281  9/1958  Cassin ............................... 296/84 K
2,933,343  4/1960  Potts ................................ 280/150 B
2,942,913  6/1960  Felts .................................. 296/84 K
3,325,208  6/1967  Rose .................................. 296/84 K

*Primary Examiner*—Robert R. Song

[57] ABSTRACT

Vehicle passenger shock attenuating crash protector, mounted adjacent the roof of a vehicle on the inside, slides forwardly and downwardly in front of the vehicle passengers on a forward directed impact of the vehicle with another object.

3 Claims, 5 Drawing Figures

VEHICLE PASSENGER CRASH PROTECTOR

This application is based on the invention in Disclosure Document No. 008379, dated Dec. 30, 1971.

This invention relates to protection devices for vehicle occupants in a forward collision of the vehicle with an object, and includes an impact resisting and shock attenuating panel which is mounted above the vehicle seats. The panel is arranged to slide downwardly in front of the occupants on an impact of the vehicle with an object, to, thereby, prevent the occupant from striking the windshield or the dash board of the vehicle. The panel may be biased toward active position so as to move faster than the occupant and be in position to receive the forwardly impelled occupant.

On an impact of one moving vehicle with another object, the momentum of carried items in the vehicle tends to maintain the velocity of these items in the direction of travel. Thus, vehicle occupants tend to maintain their velocity when the vehicle's motion is suddenly reduced or stopped. Obviously, if not restrained, the occupants abruptly contact various portions of the vehicle to their detriment. At high velocities even restraining belts and straps may not hold the occupants.

An inflatable bag has been proposed as a restraint for vehicle occupants, but several burdensome problems occur with such a device. The container for either holding or producing gas for inflating the bag is a potential danger. If a gas container is used, it must be under high pressure and therefore a hazard. If a gas producer is used it must be an explosive or pyrotechnic device which is, also, a hazard. The bag, when inflated, immobilizes the occupants and prevents control of the vehicle. This provides a still additional hazard for collisions which involves damage less than the total and not a complete stopping of the vehicle. Also, explosive devices used to inflate the bag or explosive sounds resulting from inflation tend to aggravate the psychological condition of the occupants in a collision. In some proposals, the bag is arranged for passengers only, with no protection for the driver.

According to the present invention, there is provided a sheet-like, shock attenuating, crash protector which in its passive configuration is positioned adjacent the roof of the vehicle above the occupants thereof. In this position it will provide protection to the occupants in rollovers, etc. When activated, the crash protector slides forwardly and downwardly covering the windshield and the instrument panel [dashboard] in front of the vehicle occupants. The shock attenuating panel is arranged so that a portion of the panel is forward of the vehicle occupants so that on activation it is already partially ahead of the occupant and will be in position to catch the occupant in a crash. After a crash or inadvertently activating the panel, the panel may be easily moved to its passive position for subsequent re-use when necessary.

Included among the objects and advantages of the present invention is a shock attenuator or crash protector for vehicle occupants.

Another object of the invention is to provide a crash protector activated by a forward collision of the vehicle.

Yet another object of the invention is to provide a shock attenuator mounted overhead of the vehicle occupants and movable to a position in front of such occupants in a front collision.

Still another object of the invention is to provide a shock attenuator or crash protector which is activated into a position in front of vehicle occupants in a forward collision and still permit convenient control of the vehicle following the collision; and in one form will permit continued visibility from the vehicle.

A further object of the invention is to provide a shock attenuator providing front top protection for front seat occupants of a vehicle after activation, and top protection during passive configuration for all occupants.

An additional object of the invention is to provide a shock attenuator which may be repositioned to its passive position after activation with the attenuator ready for subsequent use.

These and other objects and advantages of the invention may be readily ascertained by referring to the following description and appended illustrations in which.

Figure 1:
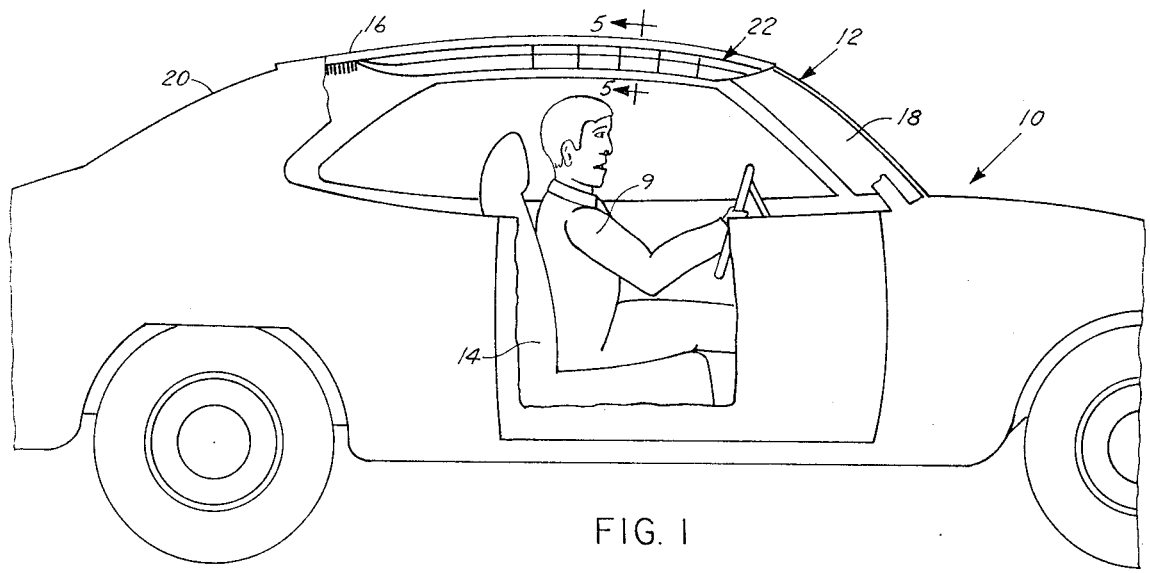
FIG. 1 is a side elevation, cutaway view of a shock attenuator or crash protector mounted in a passive position in a vehicle according to the invention.

In the device illustrated in FIG. 1, a passenger vehicle, shown in general by numeral 10, includes a passenger compartment, shown in general by numeral 12, having a seat 14 for supporting an occupant and a roof 16 which extends above the passenger compartment permitting the use of a wind screen 18 and a rear window 20. A shock attenuating or crash protector device according to the invention, shown in general by numeral 22, is mounted in its passive position below the ceiling or the inside roof of the vehicle, above the head of the occupants of the front seat, and in some instances above the head of the occupants of the rear seat.

Figure 3:
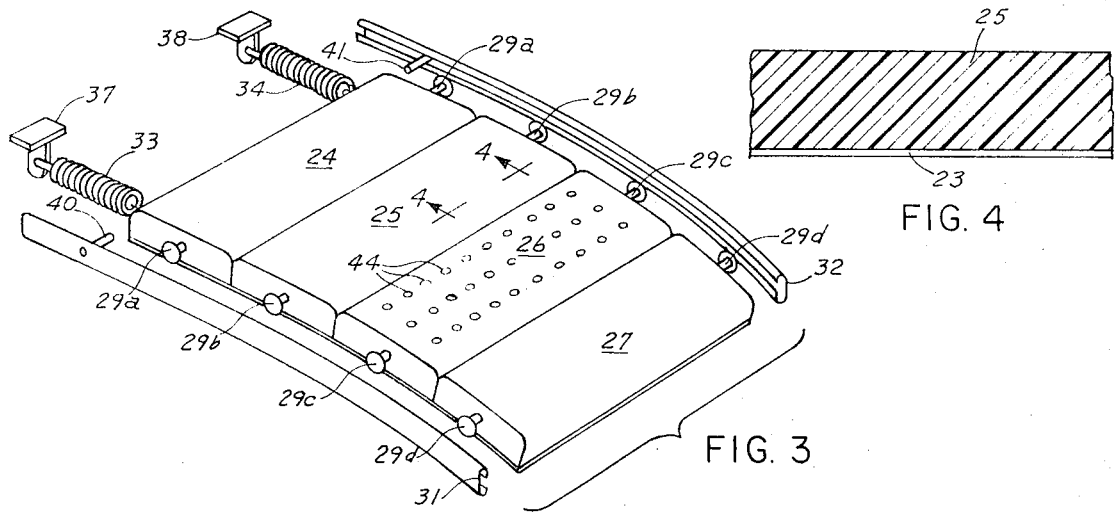
FIG. 3 is a generally schematic perspective view of one form of a crash protector for a vehicle, illustrating the mounting of the same on side rails.

One form for mounting, shown in FIG. 3, includes a plurality of foam plastic blocks 24, 25, 26 and 27. The blocks are connected together to provide an articulated attenuator, by separately securing them to a flexible plastic sheet 23. Each block is provided with track riding means, for example, a track rider 29a on each end of block 24, a track rider 29b on each end of block 25, a track rider 29c on each end of block 26, and a similar rider 29d on each end of block 27. A pair of "C" shaped tracks 31 and 32 are mounted on both sides of the inside of the vehicle compartment adjacent or on the ceiling for supporting the attenuating blocks adjacent the ceiling of the vehicle. A pair of compression springs 33 and 34 are secured to the roof by means of anchors 37 and 38 and arranged to be compressed when the attenuating means is pushed back against the springs and held in its passive configuration. A shear pin 40 is provided at one side and a shear pin 41 at the opposite side hold the springs in compressed position. A plurality of small holes 44 in block 26 provide means for the driver and/or the occupant to have some visibility through the windshield when the attenuator is moved into its activated position in front of the occupants against the windshield.

As shown, the device uses two shear pins, however, a single shear pin could be used, and/or a single spring mean be used. Also, impact release latches may be used in place of the shear pins to make it a fully reusable unit.

In use, the device is mounted on the inside roof of the vehicle with the tracks secured to the roof or body sides, and the unit is mounted in the tracks. The trackds do not need to extend beyond the roof line toward the windshield as the inertia of the panel will force it against the windshield of the vehicle. When a front end crash occurs the inertia of the attenuator breaks the shear pins (or releases the impact latches) and the springs 33 and 34 and its inertia force the unit forwardly and downwardly between the occupant and the windshield. It is to be noted that the forward edge of the unit is ahead of the occupant so that the springs and its inertia will move the unit between the occupant and the windshield before the occupant strikes the windshield. Thus, the attenuating means is between the occupant and the wind screen immediately after impact.

Figure 4:
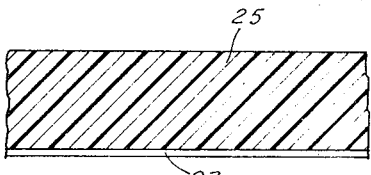
FIG. 4 is a cross-sectional view of a portion of one form of shock attenuator according to the invention illustrating one means of providing an articulated panel.

In one form of an attenuating device, foam plastic blocks, shown in FIG. 4, are secured to the flexible plastic sheet which permits articulation of the sheet as it moves outwardly and downwardly from the tracks. In the view shown in FIG. 4, for example, the block 24 is secured to the flexible plastic sheet 23 as are the other blocks which permits the blocks to bend at the joint between them. This forms an essentially curvable unit adapted to curve down in front of the windshield in front of the occupant. The thickness of the foam plastic, foam rubber or other shock attenuating material, is determined by the attenuation of the maximum shock figured for any particular collision. Generally, about an inch to an inch and a half block thickness will prevent severe injury to the occupant in head-on crashes in the low speed range, and will prevent the occupant from being missiled through the windshield. At the lower speed, the unit will secure the occupants in the passenger compartment. In its passive position, the shock attenuator provides overhead protection in the event of rollover of the unit without a head-on collision. In most sedans, by having the attenuator unit extend over the back seat to the rear window, even with the attenuator in its activated position, a portion of the attenuator will still be above the occupants of the front seat providing additional protection in the event the rear seat occupants are catapulated upwardly and forwardly or of a rollover of the vehicle.

Figure 2:
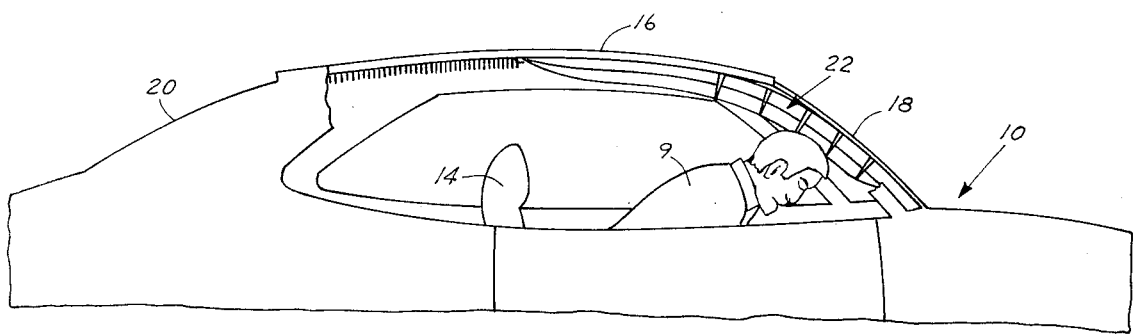
FIG. 2 is a side elevation, cutaway, detail view of the shock attenuator of the invention in a vehicle moved to activated position for protection of the occupants.

As illustrated in FIG. 2, the shock attenuator 22 has been moved into an actuated position between an occupant 9 and the wind screen 18, it being impelled forwardly by its inertia in the crash. The occupant 9, as shown in FIG. 1, is normally in a position with his head substantially behind the leading edge of the attenuator so that the attenuator has a lesser distance to travel than the occupant's head. This insures the unit to be in a position between the occupant and the wind screen. Other types of springs, gas actuated pistons, pyrotechnic actuators, and the like may be utilized to further insure that the attenuator is positioned between the occupant and the wind screen prior to the arrival of the occupant's head or other part of his body against the wind screen. A weight attenuator may provide sufficient inertia for many uses. The natural inertia may be used alone or in combination with other actuators and/or with weights, etc.

Figure 5:
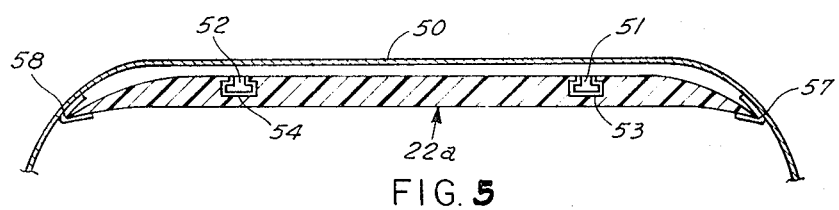
FIG. 5 is a cross sectional view of the device of FIG. 1 taken along section line 5—5 showing another method of mounting a shock attenuator in a vehicle.

Another mode of mounting the attenuator is illustrated in FIG. 5, wherein a vehicle top 50 is provided with inverted T-tracks 51 and 52 suspended downwardly from the roof 50 into the occupant's compartment. An attenuator, 22a built substantially along the lines of FIG. 1, is provided with track grooves 53 and 54 for accommodating the tracks 51 and 52 respectively. The attenuating device may, therefore, slide forwardly and rearwardly on the tracks 51 and 52 and be held in position above the head of the occupants. Edge brackets 57 and 58 secured to the roof of the vehicle cover the edges of the attenuator and prevent rattling of the attenuator in its position on the roof of the vehicle.

The device illustrated uses a semi-rigid shock attenuating unit primarily of closed cell plastic foam blocks. It may, also, be constructed of small transparent air bags (secured together) to permit visibility through the air bags when in activated position; a corrugated shock attenuator of cardboard or other shock attenuating material; a frangible material which fractures on an impact but attenuates the shock thereby, a shock absorbing sandwich of the core-wall type, exfoliated material (e.g., vermiculite and other such minerals) formed into a semi-rigid material, or other adequate shock absorbing material.

The side to side curvature construction of the shock attenuating device, in its dormant or passive position prior to being thrust forward, should normally follow the contours of the curvatures of the roof and windshield for the rigid and semi-rigid materials, but it must be made so as not to retard its rate of movement in its forward motion. In palce of the actuator or helper springs, a weighted material or bar may be placed across the front of the attenuating device; for example, a lead bar placed across the front end of block 24 or at the rear of the unit or in the joints, etc., provides means for increasing the inertia to insure that the unit will be moved into position between the occupant and the windshield.

The device of the invention depends in its inertial drive configuration on the fact that its forward portion is sufficiently ahead of the location of the driver's head, or the other occupant's head, before any activation so that if it is driven ahead at least at the same rate of motion as the occupant's head so it will be in position in front of the wind screen before the occupant's head arrives at that location. The tracks should be of minimum friction type including slide, wheel and/or roller bearings, etc., so that there will be no retarding of the motion of the attenuator in its move toward the windshield and the dashboard of the vehicle. While both mirror and sun visors may be easily attached to the attenuating device without encumbering its function, the unit may be split into two parts to provide two side by side attenuating units, both moving at the same speed towards the windshield. In such a case the mirror and the sun visors may be placed and secured to the roof in the areas between the attenuators and mirrors may be provided as outside periscope, etc. In addition to providing rollover protection and shock attenuating protection for the front end collision, the foam material provides heat and sound insulation to the interior of the vehicle.

One real advantage of the unit is that it may be easily pushed back into position in its dormant position with little effort on the part of the occupants of the vehicle. The activation of the unit may be triggered by using release catches connected to the front bumer. Any predetermined impact on the bumper may be used to release the catches permitting it to move between the occupants and the windshield.

The shock attenuating sheet may not, in some cases, be sufficiently strong to attenuate the shock of a passenger propelled forwardly without breaking. The foam plastic panels, sandwich layer panels, and other types of layers may be backed with various materials to provide necessary strength. For example, polystyrene foam may be backed by a nylon mesh, either built into the panel or attached to it. Thus, any satisfactory backing may be used with the shock attentuating panel. A metal plate or equivalent may back up the panels when sufficient shock attenuating material is available to prevent serious injury to the occupants of the vehicle. In one form, the sheet or panel may be the articulated panel described above, and the flexible sheet joining the separate panels may provide the strengthening for the panels.

I claim:

1. Vehicle crash protector for roofed vehicles comprising:
   a. a pair of spaced apart, essentially straight track means mounted in the vehicle longitudinally along the inside roof of said vehicle extending from above the rear seat of said vehicle and terminating at the upper edge of the windshield of the vehicle;
   b. shock attenuating panel means including articulated semi-rigid foamed plastic sections secured together and mounted in said track means in inoperative position, said shock attenuating panel means being of a sufficient length to extend from its forward end adjacent the windshield of the vehicle to cover the rear seat of the vehicle and provide rollover protection in its inoperative position for passengers in the vehicle front and rear seats and to cover the vehicle windshield and extend over the vehicle front seat in its activated position, said panel means extending essentially from side to side of the vehicle roof and providing an essentially smooth surface to the interior of the vehicle;
   c. means cooperative between said panel means and said track means inclusive of attenuator means to provide sufficient inertia to move said panel means along said track means on activation so that the forward portion of said panel means moves out of said track means and downwardly along the vehicle windshield ahead of a passenger; and
   d. means for temporarily securing said panel means in passive position under normal conditions in said track means above the vehicle front and rear seats and releasable on a predetermined impact of the vehicle.

2. Vehicle crash protector according to claim 1 wherein said panel means include a plurality of small spaced vision holes through a portion of said panels at least in front of the vehicle driver's seat providing vision for the driver and crash protection in its activated position.

3. Vehicle crash protector according to claim 1 wherein said means for temporarily securing said panel means includes at least one shear pin between one said track means and said panel means, said shear pin being arranged to break at a predetermined impact of the vehicle to release said panel means.

* * * * *

UNITED STATES PATENT OFFICE
CERTIFICATE OF CORRECTION

Patent No. 3814459          Dated  June 4, 1974

Inventor(s)   Robert E. Eckels

It is certified that error appears in the above-identified patent and that said Letters Patent are hereby corrected as shown below:

Col. 3, line 11 - "trackds" should be --tracks--

6, line 2 - "end" should be --edge--.

Signed and sealed this 1st day of October 1974.

(SEAL)
Attest:

McCOY M. GIBSON JR.            C. MARSHALL DANN
Attesting Officer              Commissioner of Patents